United States Patent [19]

Bowers et al.

[11] 4,381,183
[45] Apr. 26, 1983

[54] APPARATUS FOR REMOVING WASTE MATERIAL FROM A PLASTIC ARTICLE

[75] Inventors: Kenneth E. Bowers, Prairie Village, Kans.; Charles E. Markley, Kansas City, Mo.

[73] Assignee: Ethyl Development Corporation, Richmond, Va.

[21] Appl. No.: 314,007

[22] Filed: Oct. 22, 1981

[51] Int. Cl.³ .................. B29C 17/07; B29C 17/12
[52] U.S. Cl. ................................. 425/182; 264/536; 425/526; 425/527; 425/531; 425/806
[58] Field of Search .......... 425/527, 531, 806, 806 A, 425/182, 526; 264/536

[56] References Cited

U.S. PATENT DOCUMENTS

| | | |
|---|---|---|
| 2,994,103 | 8/1961 | Schaich . |
| 3,040,376 | 6/1962 | Elphee . |
| 3,098,593 | 7/1963 | Heider . |
| 3,172,152 | 3/1965 | Unlig . |
| 3,266,083 | 8/1966 | Kemp . |
| 3,351,981 | 11/1967 | Rupert . |
| 3,363,282 | 1/1968 | Hagen et al. . |
| 3,417,428 | 12/1968 | Rupert . |
| 3,464,084 | 9/1969 | Thompson . |
| 3,465,931 | 9/1969 | Rupert . |
| 3,486,190 | 12/1969 | Waechter et al. . |
| 3,486,442 | 12/1969 | Weber . |
| 3,506,171 | 4/1970 | Rupert . |
| 3,901,637 | 8/1975 | Eggert .............................. 425/527 |
| 3,910,742 | 10/1975 | Lynn ................................. 425/527 |

Primary Examiner—Jan H. Silbaugh
Attorney, Agent, or Firm—Donald L. Johnson; John F. Sieberth; Edgar E. Spielman, Jr.

[57] ABSTRACT

An apparatus for removing a waste portion from a blow molded article is disclosed. The apparatus removes the waste portion while the article is enclosed within the blow mold and features a gripping structure for gripping the waste portion and a power assembly associated with the gripping structure to move the gripping structure from the article, thereby pulling the waste portion from its point of attachment with the article. The gripping structure includes two opposed gripping means which are arcuately movable about their respective pivot points. Each pivot point is laterally displaced from the gripping structure and positioned along a line extending through the shortest distance from the pivot point to that portion of the gripping structure which is closest to the attachment of the waste portion to the article.

15 Claims, 5 Drawing Figures

APPARATUS FOR REMOVING WASTE MATERIAL FROM A PLASTIC ARTICLE

BACKGROUND OF THE INVENTION

In the blow molding of plastic bottles, it has long been an objective to produce a bottle with a completely finished base in the blowing step. Earlier methods and apparatuses for producing bottles from tubular parisons have not been completely effective in the removal of the tail from the bottle subsequent to the blowing step. It is often necessary to subject the bottle to a secondary finishing operation to completely finish the base of the bottle. A number of methods and apparatuses have been proposed for severing the tail from the bottle. In U.S. Pat. No. 2,994,103 there is disclosed an apparatus that removes the waste portion from the blown plastic article while the article is supported by the mold. However, to initiate the removal process, the mold must be partially opened. This step requires additional time and results in lower output. The apparatuses described in U.S. Pat. Nos. 3,098,593; 3,172,152; 3,351,981; 3,465,931; and 3,486,190 all require that the article be removed from the mold to a waste removal station. The articles are removed to the waste removal station by a variety of methods, none of which utilize grasping the waste portion. U.S. Pat. Nos. 3,040,376; 3,266,083; 3,417,428; 3,464,084; and 3,506,171 also require that the article be removed from the mold and taken to a waste removal station. However, these patents do make use of the waste portion by engaging the waste to remove the article to the station. All of the above-mentioned patents require either that the article be removed from the mold before removing the waste or that the mold be partially opened before the waste is removed. U.S. Pat. No. 3,363,282 discloses an apparatus for removing the waste from a blown plastic article while the article is still in the closed mold. However, the apparatus does not possess the required versatility for attachment to a variety of different blow molds. The apparatus has to be mounted on the side of the mold cavity which will result in a requirement for more lateral space when the mold is open.

In U.S. Pat. No. 3,910,742, an apparatus is shown which removes the waste portion, e.g., the tail, while the article is retained in the mold. Due to the versatility of this apparatus, it is suitable for use with a variety of existing blow molding machines. The apparatus obtains a hold on the waste portion by means of a pair of opposed grippers having planar gripping faces. A power piston associated with each gripper moves the gripper arcuately downwardly about its pivot point to break and move the gripped waste portion from the article. Each pivot point is located so that it is laterally offset from the planar gripper surface and below the uppermost extent of the gripper surface. By each pivot point being so located, rotation of the planar surfaces about their respective pivot points causes the uppermost extent of the gripper surfaces to move toward one another as they make their downward rotation. This is due to the fact that the distance $R_1$, from the pivot point to the uppermost extent of the planar gripping surface is greater than the shortest distance, $R_2$, from the pivot point to the planar gripping surface. (This shortest distance is measured along a horizontal line through the pivot point to the planar surface.) Since $R_1$ is larger than $R_2$, that portion of the planar surface measured at $R_1$ moves along an arc outside of the arc travelled by the planar surface portion at $R_2$. Thus, the opposed planar surface portions at $R_1$ move toward each other resulting in a pinching of the waste portion. When the pinching is severe enough, the waste portion is cut at the pinch point, thus disrupting the downward pull necessary to remove the waste portion from the article. Thus, the waste portion is not removed from the article and the article must either be rejected or the waste portion must be removed by a secondary operation. In either case, the economics of operating this type of apparatus is adversely affected.

Therefore, it is an object of this invention to provide an apparatus for completely removing the waste portion of a plastic article while the article is retained within the mold cavity and which apparatus does not sever the waste portion prior to the waste portion being pulled from the article.

THE INVENTION

This invention relates to an apparatus for removing waste material from a blow molded thermoplastic article while the article is still enclosed in the blow mold in which the article is formed. For example, the apparatus of this invention is useful in removing the tail formed during the production of hollow bodied articles, e.g. containers, from tubular thermoplastic parisons.

The apparatus of this invention is mountable on most conventional blow molding machines. Positioning of the apparatus can be achieved by simple bolt-on techniques which place the apparatus so that it can engage the waste portion to effect its removal. For example, when the apparatus is used to remove the tail from the bottom of a blow molded container, the apparatus is placed beneath and adjacent the bottom of the split blow mold.

Generally speaking, the apparatus of this invention has two opposed pivotably mounted grippers which have faces which coact with one another to grip the waste portion. Since removal of the gripped waste portion is achieved by pulling it from its point of attachment to the article, power means are provided in association with the grippers to cause them to move away from that point of attachment. To achieve fidelity in gripping, each gripper face, preferably, is planar and has a texture or face configuration which enhances gripping qualities.

In a preferred form, a separate power means is associated with each gripper. When this arrangement is used, the apparatus of this invention has two identifiable halves. Positioning of the apparatus halves with respect to a split blow mold is such that a half of the apparatus is affixed adjacent one blow mold half, while the other apparatus half is affixed adjacent the other mold half. Closing of the split blow molds brings the apparatus halves into position for achievement of the waste removal function.

An important feature of the apparatus of this invention is that each gripper is pivotedly mounted so that its pivot point is laterally offset from the gripper face and lies along a line, X—X, which extends through the shortest distance, Y—Y, between the pivot point and the part, M, of the gripper face closest to the aforedescribed point of attachment between the waste portion and the article. This positioning of the pivot point is unlike the positioning described in U.S. Pat. No. 3,910,742 wherein the pivot point is beneath that part of the gripper face closest to the point of attachment. By the apparatus of this invention having M and the pivot point on the same line that is congruent with the shortest distance line, Y—Y, downward and arcuate movement of the gripper face does not result in the coming together of opposed gripper face parts to cause cutting of the waste portion, which cutting is sometimes a problem with the U.S. Pat. No. 3,910,742 apparatus.

These and other features of this invention contributing satisfaction in use and economy in manufacture will be more fully understood from the following description of a preferred embodiment in the accompanying drawings in which identical numerals refer to identical parts and in which.

Figure 1:
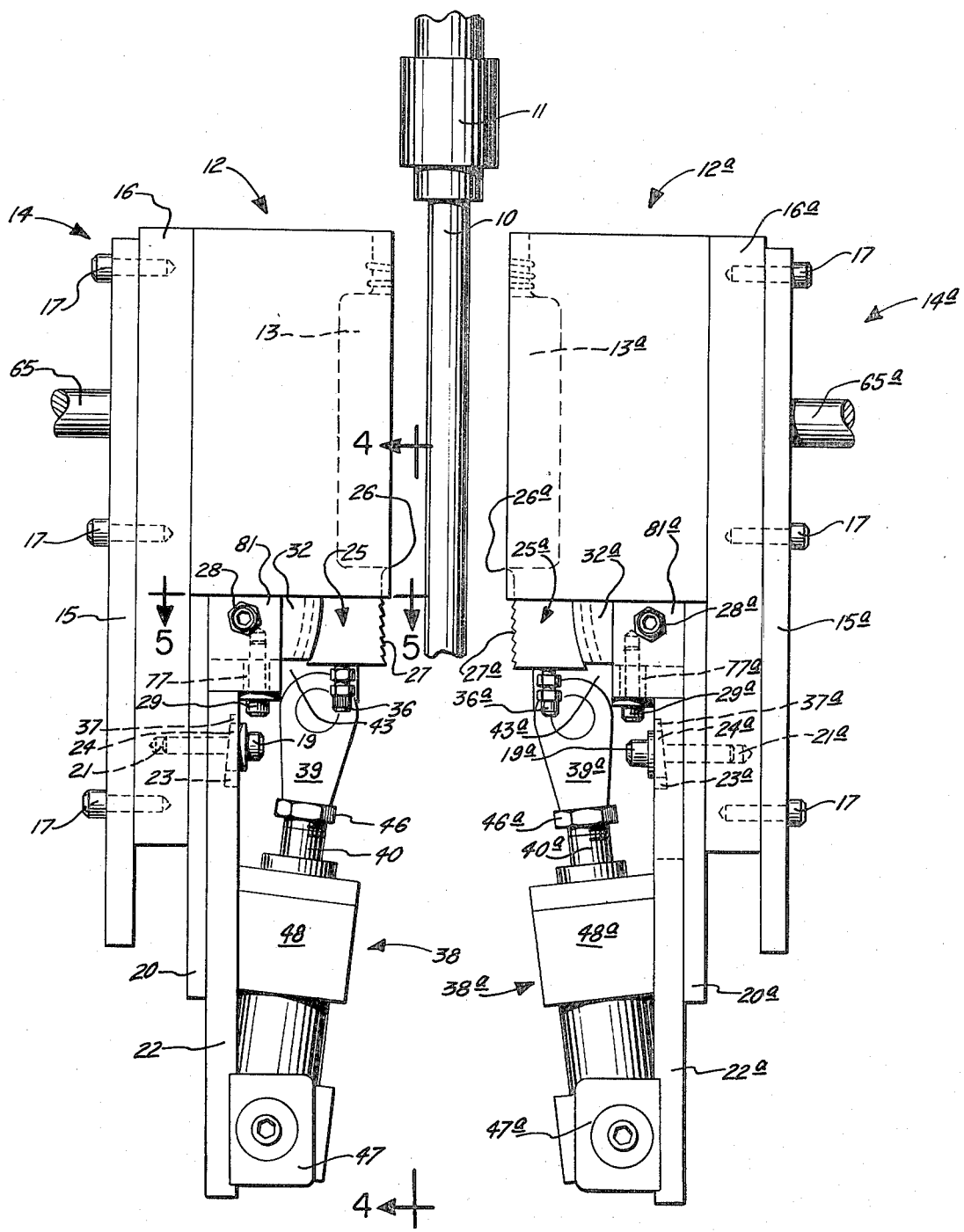
FIG. 1 is an elevational view of a split blow mold in the open position with a tail removal assembly constructed in accordance with the present invention and positioned to engage the tail of the parison.
Figure 2:
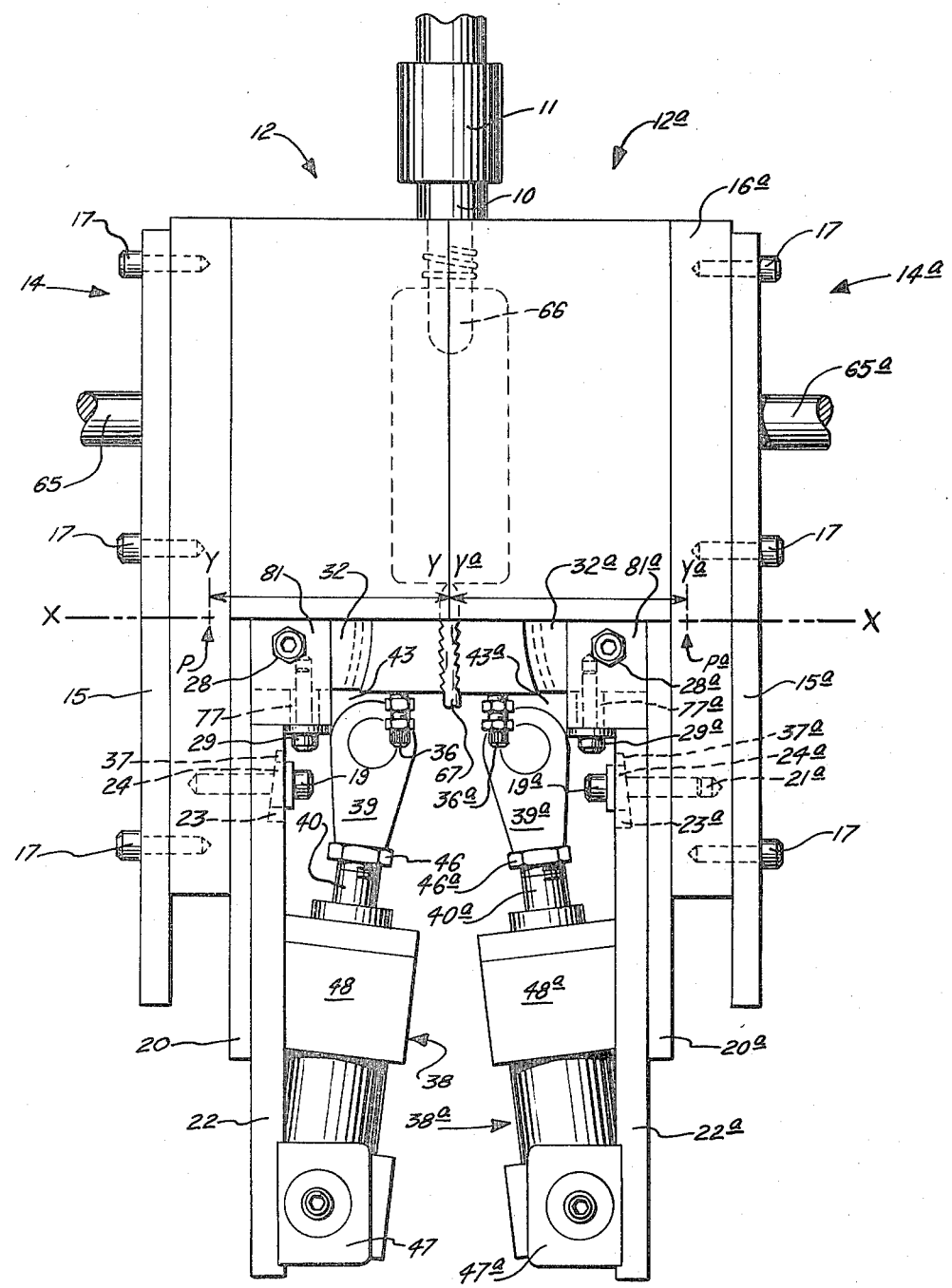
FIG. 2 is an elevational view of the split blow mold of FIG. 1 in the closed position with the tail removal assembly in the closed position engaging the tail of the extruded parison.

Referring now to FIGS. 1-4, there is shown one embodiment for a blow molding apparatus for carrying out the present invention. FIG. 1 depicts the position of the apparatus during the parison extrusion step. The plastic parison 10 is forced from the extruder head 11 and is positioned between a split blow mold having a left half 12 and a right half 12a which are shown in the open position. The mold halves 12 and 12a have mold cavities 13 and 13a, respectively, which are shaped to the form of the plastic article to be blown. The mold halves 12 and 12a are supported by mold support structures, designated generally by the numerals 14 and 14a, which include platens 15 and 15a and back plates 16 and 16a connected by means of bolts 17. The mold support structures extend below the mold halves in order to allow the tail-grasping assembly, which includes left and right subassemblies designated generally by the numerals 18 and 18a, to be attached to the mold support structures by vertical positioning bolts 19 and 19a which are received in threaded cylindrical openings 21 and 21a in back plates 16 and 16a. Vertical slots 23—23 and 23a—23a in the tail-grasping subassembly support plates 22 and 22a receive bolts 19—19 and 19a—19a and allow vertical adjustment of the support plates 22 and 22a. Recessed surfaces 37—37 and 37a—37a surrounding slots 23—23 and 23a—23a are inclined to align with chamfer blocks 24—24 and 24a—24a which are carried on bolts 19—19 and 19a—19a. By tightening bolts 19—19 and 19a—19a, force is applied to the chamfer blocks 24—24 and 24a—24a causing the assembly support plates 22 and 22a to move in an upward direction, thereby insuring that the pivotably mounted gripping arms, designated generally by numerals 25 and 25a, are positioned directly beneath the mold halves 12 and 12a. To insure alignment of the gripper faces 27 and 27a of tail-grasping subassemblies 18 and 18a with the vertical cutting edges 26 and 26a of the mold cavities 13 and 13a, there is interposed between the back plates 16 and 16a and the tail-grasping assembly support plates 22 and 22a spacers 20 and 20a. To obtain the correct position of the tail-gripping faces 27 and 27a to insure that these faces will completely engage the tail when the mold is in the closed position, as shown in FIG. 2, there are also provided horizontal adjustment screws 28 and 28a.

Figure 5:
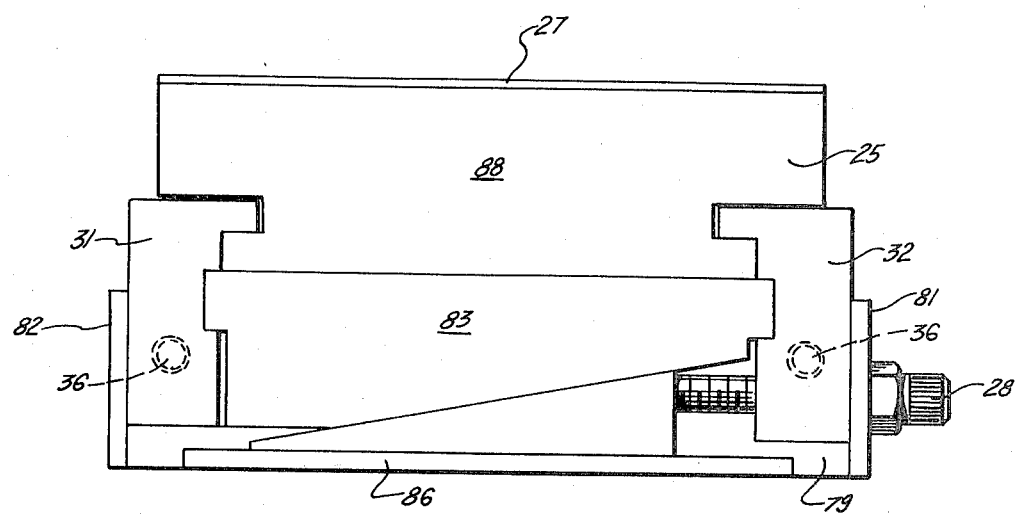
FIG. 5 is a sectional view taken through section lines 5—5 in FIG. 1.

Referring now to FIGS. 1 and 5, these screws 28 and 28a are positioned in threaded holes "h" in guide blocks 32 and 32a. Horizontal adjustment screws 28 and 28a, at their distal ends, contact adjustment wedges. (For the sake of simplicity, only one adjustment assembly and gripping arm is discussed and shown in the drawings in detail, see FIG. 5, it being understood that the two assemblies and arms are identical, one being the mirror image of the other.) Adjustment wedge 84 moves either inwardly or outwardly in response to the turning of screw 28. As wedge 84 moves horizontally, adjustment bar 83 is caused to move horizontally transverse the movement of wedge 84. Since right and left hand guide blocks 32 and 31 are free to move within bracket 79, which defines a path of movement between ears 81 and 82, outward movement of wedge 83 moves gripping arm 25 towards the vertical center line of the split blow mold. Inward movement will cause movement of gripping arms 25 away from this vertical center line. Once the proper horizontal spacing between gripper faces 27 and 27a has been accomplished by use of adjustment screws 28 and 28a respectively, locking bolts 29—29 and 29a—29a are tightened to lock in the positions desired. Note that the locking bolts fit into threaded bores in their respective guide blocks and pass within their respective enlarged slots 77 and 77a. Adjustment of the horizontal spacing should be such that the gripper faces 27 and 27a can obtain a good grip on the tail without flattening it to the extent that it is too weak to withstand the downward pull necessary to remove it from the container.

As can be seen in the Figures, gripping arm 25 has a planar face 27 with a toothed configuration. By utilizing the planar face then high fidelity gripping of the parison is effected. Gripping arms 25 have a curved rearward portion 88 which fits within a curved recess 85, which is formed by the adjustment bar and the guide blocks utilized in each assembly half. For the assembly half shown in FIG. 5, adjustment bar 83 and guide blocks 31 and 32 are used. Slidably fitted within this recess is arcuate cam portion 88 of gripping arm 25. The pivot point for gripping arm 25 will be located at the end of the arc radius as shown in FIG. 2 and labeled P and $P_a$. Note that with this location that the uppermost extent of the gripper faces is in line with pivot points P and $P_a$, that line being labeled X—X and overlying the shortest distance between the pivot points and the uppermost extent of the gripper faces 27, that distance being labeled Y—Y. By utilizing this arrangement, as before mentioned, pinching together of any part of the gripper faces will not occur since no part of any gripper face is required to rotate through the line X—X.

Figure 4:
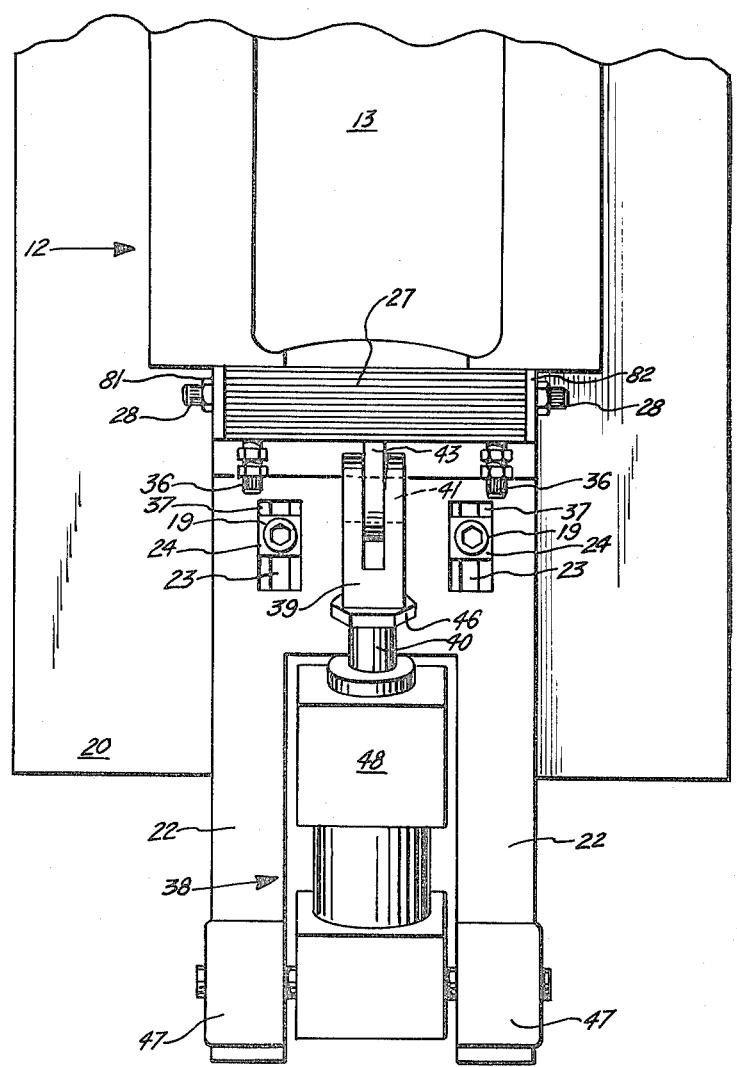
FIG. 4 is a broken partial front view of FIG. 1 taken along section lines 4—4.

Referring now to FIG. 4, a cooling medium is circulated through the hollow bore (not shown) provided in grasping arms 25 and 25a by cooling tubes 36 and 36a. The cool face assures the rigidity of the tail so that it might be severed more easily. The grasping arms 25 and 25a are connected to the double-acting cylinders 38 and 38a by means of pivotably mounted, U-shaped connectors 39 and 39a adjustably attached to connecting rods 40 and 40a. As seen in FIG. 6, the upper ends of the connectors 39 and 39a have a transverse hole which aligns with a transverse hole in downwardly projected shafts 43 and 43a of the grasping arms 25 and 25a to form continuous transverse holes 41 and 41a through which connecting pins 42 and 42a pass and are received in transverse holes 41 and 41a in the upper ends of the U-shaped connectors 39 and 39a. The base of connectors 39 and 39a has threaded holes which receive the threaded ends of the connecting rods 40 and 40a. At the juncture of the U-shaped connectors 39 and 39a and the connecting rods 40 and 40a, there are locking nuts 46 and 46a threaded onto the connecting rods 40 and 40a to aid in positioning the double-acting cylinders 38 and 38a.

The double-acting cylinders are pivotably mounted on the tail-grasping assembly support plates 22 and 22a by means of trunnion blocks 47 and 47a. The double-acting cylinders may be of any conventional design so long as they are capable of providing the necessary movement to gripper arms 25 and 25a.

Figure 3:
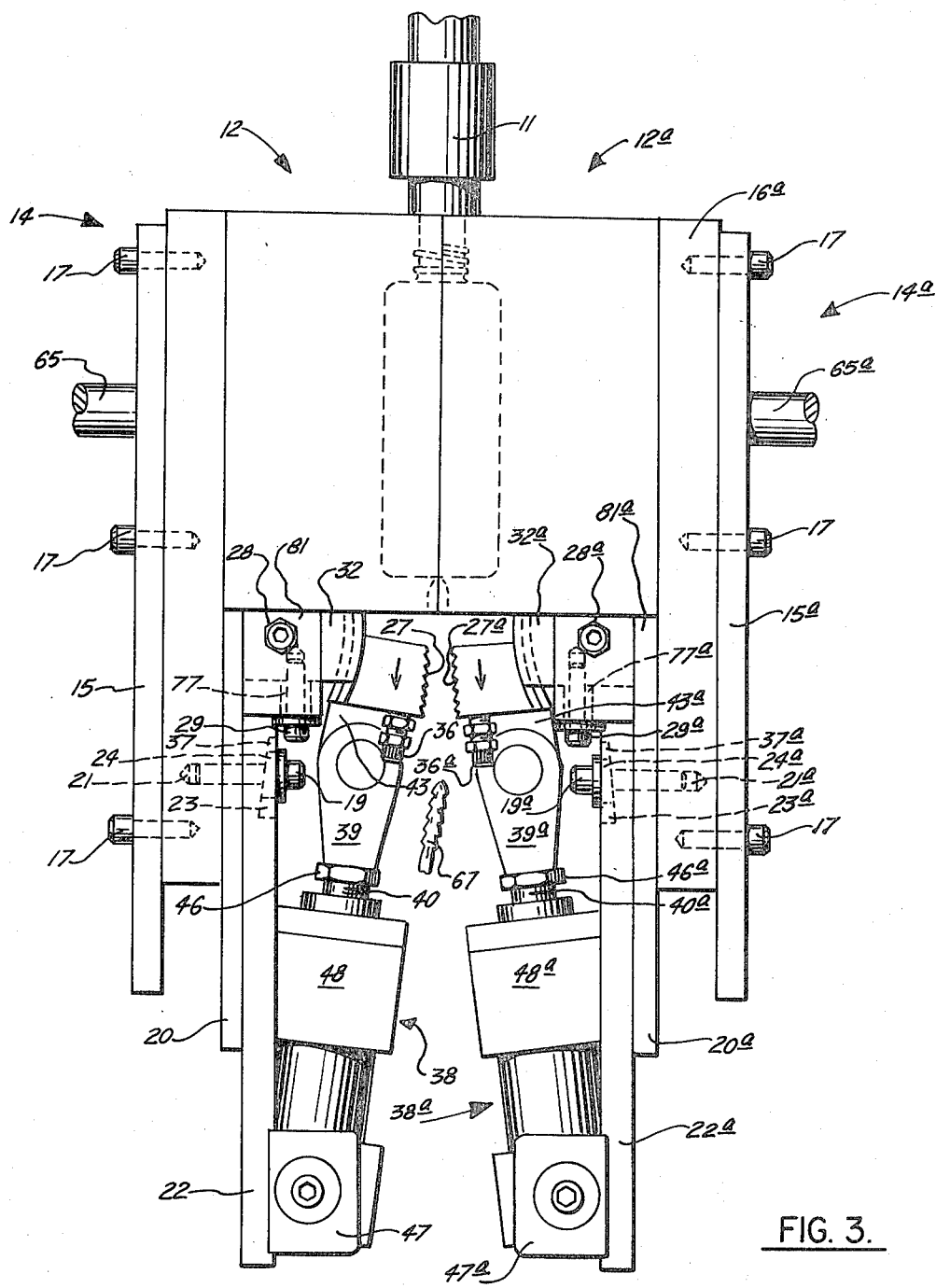
FIG. 3 is an elevational view of the split blow mold of FIG. 1 showing the position of the tail removal assembly after the pivotably mounted grippers have removed the tail from the hollow article in the mold.

In operation, the parison 10 is extruded from the extruder head 11 and is allowed to move to a position between the open mold halves 12 and 12a, as seen in FIG. 1. The platens 15 and 15a are moved to a closed position by the push rods 65—65 which allow the parison 10 to be enclosed by the mold halves 12 and 12a and, at the same time, allow the pivotably mounted tail-grasping arms 25 and 25a to engage the tail moil 67 of the extruded parison 10, as seen in FIG. 2. Air is introduced through the hollow mandrel 66 to blow the article to the shape defined by cavities 13 and 13a. The double-acting cylinders 38 and 38a are activated causing the connecting rods 40 and 40a to exert a downward force on the tail-grasping arms 25 and 25a, which move in the path of an arc causing the tail moil 67 to be severed from the article being blown and allowing it to fall into a waste container (not shown), as seen in FIG. 3. When the blowing operation has ceased, the mold halves 12 and 12a are opened and the double-acting cylinders 38 and 38a are again activated causing connecting rods 40 and 40a to exert an upward force on the tail-grasping arms 25 and 25a to return them to the up position ready to engage the next parison tail.

From the foregoing, it can be seen that the apparatus of the present invention provides a system for producing hollow plastic containers made from thermoplastic materials, for example, material such as polyethylene, polypropylene and polyvinyl chloride, wherein the base of the container is completely finished within the mold during the blow molding step.

Another feature of the apparatus of this invention is that movement of the gripper arms 25 does not occur about a pivot pin, but rather occurs with cam portion 88 sliding within arcuate recess 85. As can be appreciated, by eliminating the use of a pivot pin, this point of maintenance is removed as the cam-recess arrangement is more long lived than when a pivot pin is utilized.

What is claimed:

1. In an apparatus for blow molding a hollow, plastic article from a tubular plastic parison in which said apparatus includes, a split blow mold having two halves, two individual mold support means, one of each support means being attached to one of each mold half and extending below a bottom forming end of each respective mold half, power means to move each individual support means and each associated mold half to open and close said split blow mold and in which said hollow plastic article, while being enclosed and supported by said mold halves, has a tail attached thereto which depends from the bottom forming ends of said mold halves; an improved tail grasping assembly for removing said tail from said hollow article, which assembly comprises:

a. first and second assembly support frames, said first assembly support frame being adjustably attached to one of said two mold support means and said second assembly support frame being adjustably attached to the other of said mold support means, said first and second assembly support frames being positioned below said bottom-forming ends of said mold halves;

b. first and second power means, said first power means being attached to said first assembly support frame and said second power means being attached to said second support frame, said first and second power means each having a connecting rod extending therefrom towards said bottom-forming ends of said mold halves; and c. first and second gripping means, said first gripping arm being attached to said first power means and said second gripping means being attached to said second power means, said first and second gripping means being pivotably mounted to said first and second assembly support frames respectively, each pivotal mounting being about a point which is laterally offset from its respective gripping means and in a horizontal plane in which lies that portion of the respective gripping means which is closest to said bottom forming ends of said mold halves, said first and second gripping means being located immediately adjacent to the bottom-forming end of said mold halves and together adapted to engage between them the depending tail for removal from said hollow article upon actuation of said first and second power means.

2. The apparatus of claim 1 wherein each mold support means is a platen attached to a backplate.

3. The apparatus of claim 2 wherein both said platen and backplate extend outwardly from the bottom forming end of each respective mold half.

4. The apparatus of claim 2 wherein said gripping means are adjustably mounted on said assembly support frames.

5. The apparatus of claim 1 wherein said gripping means are provided with fluid passages for circulation of a cooling fluid.

6. The apparatus of claim 1 wherein there is interposed between each one of said assembly support frames and each one of said mold support means a spacer attached to each respective mold support means.

7. The apparatus of claim 1 wherein each one of said assembly support frames is attached to each respective mold support means by a positioning bolt.

8. The apparatus of claim 7 wherein each one of said assembly support frames is adjustable toward or away from its respective mold half by chamfer surface means.

9. The apparatus of claim 1 wherein each one of said power means is a double-acting cylinder and is pivotably mounted on its respective assembly support frame.

10. The apparatus of claim 9 wherein each one of said double-acting cylinders is mounted on its respective support frame by a trunnion block.

11. The apparatus of claim 10 wherein said double-acting cylinders are adjustably mounted in said trunnion blocks.

12. The apparatus of claim 1 wherein each of said gripping means has a planar face for engagement of said tail.

13. The apparatus of claim 1 wherein each of said gripping means has an arcuate cam portion slidably fitted within an arcuate recess to define the pivotal movement of each of said gripper means.

14. The apparatus of claim 13 wherein each of said arcuate recesses is held in mounted relationship with said assembly support frames.

15. In an apparatus for blow molding a hollow, thermoplastic article from a tubular thermoplastic parison in which said apparatus includes, a split blow mold having two mold halves, two mold support means, one of each support means being attached to one of each mold half and extending below a bottom forming end of each respective mold half, power means to move each individual support means and each associated mold half to an open and closed position; said hollow, thermoplastic article, while being enclosed and supported by said mold halves has a waste portion attached thereto which depends outwardly of said mold halves; an improved assembly associated with said apparatus for grasping and removal of said waste portion, said assembly comprising:

a. two opposed gripping means which coact with one another to grip said waste portion, each of said gripping means being arcuately moveable away from said mold halves with each of said arcuate movements being about a separate pivot point, said each separate pivot point being laterally displaced from its respective gripping means and in a horizontal plane in which lies that portion of said each gripping means associated with said each pivot point which is closest to said bottom-forming ends of said mold halves; and b. first and second power means to effect said arcuate movement, said first power meas being associated with one of said gripping means and second power means being associated with said second gripping means.

* * * * *